United States Patent [19]

Doerfling et al.

[11] 4,385,955

[45] May 31, 1983

[54] METHOD OF FORMING CONTOURED FIBERGLASS SHEET

[75] Inventors: Ralph G. Doerfling, Northville; Donald H. Warner, Southfield, both of Mich.

[73] Assignee: Detroit Gasket, Detroit, Mich.

[21] Appl. No.: 300,335

[22] Filed: Sep. 8, 1981

[51] Int. Cl.³ .................. B29D 3/00; B29D 31/00; B29G 5/00

[52] U.S. Cl. .................. 156/245; 264/257; 264/258

[58] Field of Search .............. 156/242, 245; 264/137, 264/257, 258, 336, 45.3, 45.5; 428/170, 272

[56] References Cited

U.S. PATENT DOCUMENTS

| | | | |
|---|---|---|---|
| Re. 27,474 | 9/1972 | Thomas | 427/389.9 |
| 2,797,179 | 6/1957 | Reynolds et al. | 264/257 |
| 2,938,737 | 5/1960 | Walker | 156/245 |
| 3,025,202 | 3/1962 | Morgan et al. | 264/45.3 |
| 3,044,922 | 7/1962 | Kappel | 264/258 |
| 3,060,068 | 10/1962 | Hannes | 428/218 |
| 3,141,809 | 7/1964 | Di Maio et al. | 428/218 |
| 3,141,811 | 7/1964 | Fox et al. | 428/218 |
| 3,184,527 | 5/1965 | Fischer | 264/255 |
| 3,193,598 | 7/1965 | Schafer | 264/45.1 |
| 3,309,448 | 3/1967 | Schilling | 264/245 |
| 3,395,201 | 7/1968 | Kalwaites | 264/45.3 |
| 3,627,603 | 12/1971 | Greig | 156/79 |
| 3,634,126 | 1/1972 | Cain et al. | 427/389.9 |
| 3,652,377 | 3/1972 | Helmick | 428/218 |
| 3,684,645 | 8/1972 | Temple et al. | 428/220 |
| 4,034,137 | 7/1977 | Hofer | 428/322.7 |
| 4,080,416 | 3/1978 | Howard | 264/258 |
| 4,123,488 | 10/1978 | Lawson | 264/135 |
| 4,131,664 | 12/1978 | Flowers et al. | 264/510 |

Primary Examiner—Willard E. Hoag
Attorney, Agent, or Firm—Cullen, Sloman, Cantor, Grauer, Scott & Rutherford

[57] ABSTRACT

A method of forming a contoured fiberglass-resin sheet or panel having a smooth finish surface, including large self-supporting contoured panels, such as used for automotive headliners and interior automotive panels. The method includes first forming an uncured resin impregnated fiberglass sheet in a contoured die under sufficient pressure to substantially fully compress the fiberglass sheet and simultaneously curing the smooth finish contoured surface only of the sheet. The sheet is then reformed and cured in the final contoured configuration, which may include areas of different density, as required by the application of the panel. A second uncured resin-fiberglass sheet may be applied over the first partially cured sheet, prior to reforming, to better control the density, and form a permanently laminated contoured panel.

13 Claims, 12 Drawing Figures

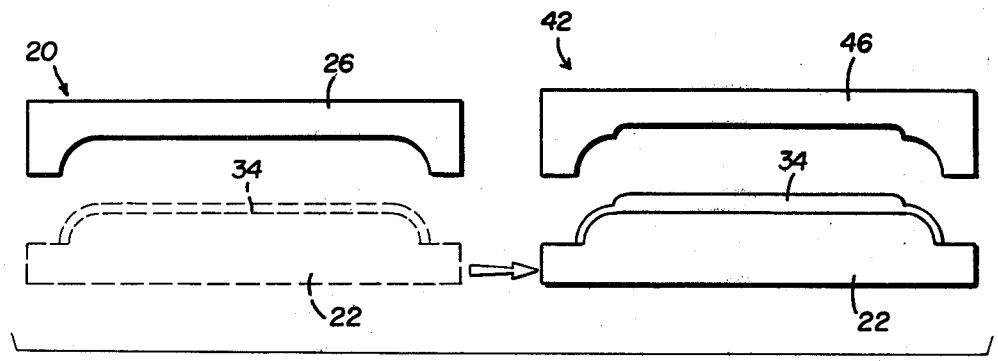
FIG. 10
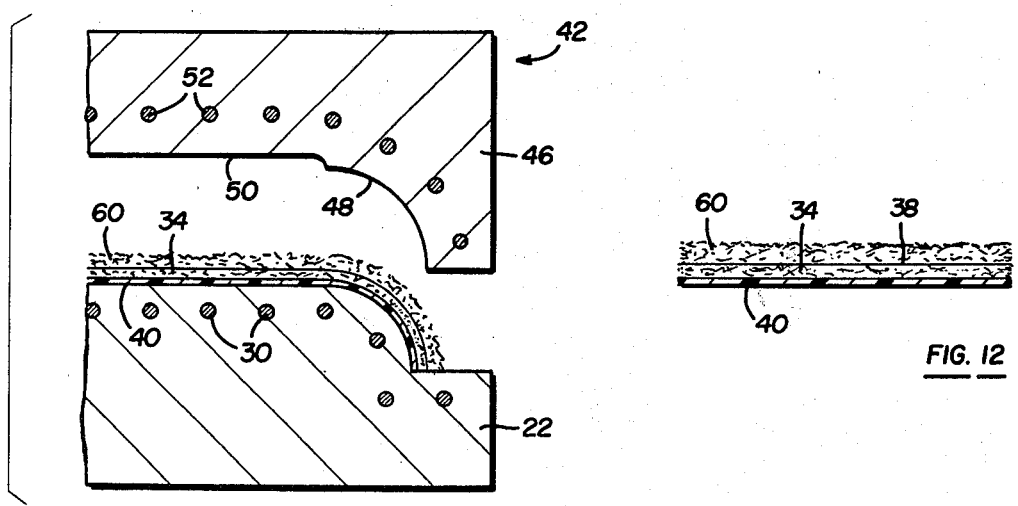
FIG. 11
FIG. 12

METHOD OF FORMING CONTOURED FIBERGLASS SHEET

FIELD OF THE INVENTION

A method of forming contoured panels or sheets, particularly sheets of loose glass fibers impregnated with an uncured resin. Such contoured panels are used in the automotive industry for headliners and interior panels, however the method of this invention may be used to form contoured panels for any application requiring a lightweight sound attenuating or heat absorbing contoured panel.

DESCRIPTION OF THE PRIOR ART

Automotive headliners and interior automotive panels must be lightweight, able to withstand extreme temperature variations, fire retardant, and provide sound attenuation. Synthetic fibers, including fiberglass-resin panels, meet these requirements and have been used for many automotive applications, including headliners. Loosely woven or accumulated sheets of glass fibers impregnated with an uncured resin are commercially available from Owens-Corning Fiberglass Corporation and other manufacturers, as disclosed in U.S. Pat. No. 3,025,202, which is incorporated herein by reference.

As disclosed in the above referenced patent, continuous glass fibers are chopped or blown into fibers, sprayed with a liquid synthetic resin, such as thermosettable phenolfermaldehyde, and collected in a loose sheet on a continuous conveyor belt. The sheet may then be compressed and heated or formed in a heated mold forming a self-supporting panel or structure. Because the glass fibers are randomly collected on the conveyor, the sheet has substantial variations in density. When the fiberglass-resin sheet is formed into a contoured panel, the surfaces are generally wrinkled, although the sheet is simultaneously heated and compressed. In automotive applications, such as headliners, the wrinkles must be controlled, resulting in numerous rejections. This problem has been partially solved by covering the finish surface of the fiberglass-resin panel with a soft cover sheet, such as a foam backed cloth, which partially hides the wrinkles.

In certain applications, the contoured panel must include predetermined variations in density. For example, in automotive headliners, the central portion of the headliner has a lesser density for better heat absorption and sound attenuation, while the side edges and ends are compressed to provide strength and rigidity to support the panel. This requirement compounds the wrinkle problem, which has not been solved prior to the method of this invention. Further, automotive headliners preferably have substantially uniform density in the central portion, which is not possible using present methods.

The method of this invention solves the problems of the prior art by using a two-step process, wherein the wrinkles are first ironed out and the smooth contoured finish sheet is simultaneously "kiss cured." The sheet may then be formed into the final contoured configuration and fully cured, including predetermined variations in density.

SUMMARY OF THE INVENTION

As described, the method of this invention utilizes a two-step process which substantially eliminates wrinkling of the fiberglass-resin sheet and permits the formation of areas of different density, while maintaining the smooth finish surface. First, an uncured resin impregnated sheet of loose glass fibers or other inert fibers is formed under uniform and sufficient pressure to substantially compress the sheet into a contoured shape and iron out any wrinkles in the sheet. The finish surface is simultaneously heated to cure the resin in the finish layer only and set the smooth contour of the finish surface. The remainder of the thickness of the fiberglass-resin sheet is not cured in the first forming step and the sheet therefore expands to substantially the original thickness when the forming pressure is released. The sheet is then compressed and formed under heat and pressure, preferably in a second die set having variations in thickness, wherein the remainder of the resin in the sheet is cured and the second die set simultaneously forms areas of predetermined different densities.

In the preferred method, the sheet is formed in two die sets. The first die set has opposed contoured dies which are substantially evenly spaced throughout their forming contour and the uniform forming pressure of the first die set is sufficient to substantially fully compress the sheet and iron out any wrinkles. The finish surface of the fiberglass-resin sheet is cured by heating the contoured die contacting the finish surface, curing the surface layer only and setting the smooth contour of the finish sheet. The forming pressure of the first die set is then removed, permitting the fiberglass sheet to expand. The partially cured sheet is then formed in a second die set having opposed heated contoured dies wherein one die substantially conforms to the finish surface and the opposed die preferably has relieved areas forming areas of reduced density extending from the back surface of the sheet. The heated dies simultaneously cure the resin in the fiberglass sheet to permanently form the contour of the sheet to the contour of the second die set. In the most preferred method, the contoured die contacting the finish surface of the sheet is common to the first and second die sets. In an automotive headliner, for example, the interior concave surface of the headliner is the finish surface of the sheet and the male die is therefore common to both die sets. The male die is heated to cure the smooth finish layer only of the sheet, or "kiss cured." The heated male die is then repositioned in registry with a heated female die of the second die set, and the partially cured contoured panel is heated, formed and fully cured in the second die set.

Variations in the density of the fiberglass-resin sheet may be substantially eliminated by applying a second sheet over the first partially cured sheet, prior to finally curing of the first sheet in the second die set. The fiberglass-resin sheet normally includes random pockets or areas of reduced density, which will not be aligned when two sheets are utilized. This method therefore substantially eliminates unwanted variations in density in the finished contoured fiberglass sheet.

The method then includes forming a first uncured resin impregnated fiberglass sheet under substantially even pressure in a first die set having opposed substantially evenly spaced matching contoured dies. As described, the forming pressure is sufficient in the first die set to substantially fully compress the sheet and iron out any wrinkles. One die member of the first die set is heated to kiss cure the finish surface only of the sheet. The forming pressure is then removed, permitting the partially cured sheet to expand. A second uncured resin impregnated sheet is then applied over the first sheet and the sheets are formed under heat and pressure, simultaneously curing and laminating the sheets into a contoured permanently laminated panel. As described, the die members of the second die set preferably include relieved areas which form predetermined areas of reduced density in the laminated contoured panel.

The method of this invention thus substantially eliminates wrinkling of the contoured fiberglass-resin panel and permits the formation of areas of reduced density, which are required for many applications, such as automotive headliners. The method is relatively simple and may be a continuous process, wherein the mald die member is shuttled between the unheated and heated female die members. Other advantages and meritorious features of the present invention will be more fully understood from the following description of the preferred embodiments, the appended claims, and the drawings, a brief description of which follows.

BRIEF DESCRIPTION OF THE DRAWINGS

FIG. 10 illustrates schematically a shuttle die assembly which may be used in the method of this invention;

FIG. 11 is a partial end cross-sectional view of the die set shown in FIG. 7 forming a contoured fiberglass-resin laminate; and FIG. 12 is a partial end cross-sectional view of the fiberglass-resin laminate to be formed in the die set of FIG. 11.

DESCRIPTION OF THE PREFERRED METHOD AND EMBODIMENTS OF THIS INVENTION

Figure 1:
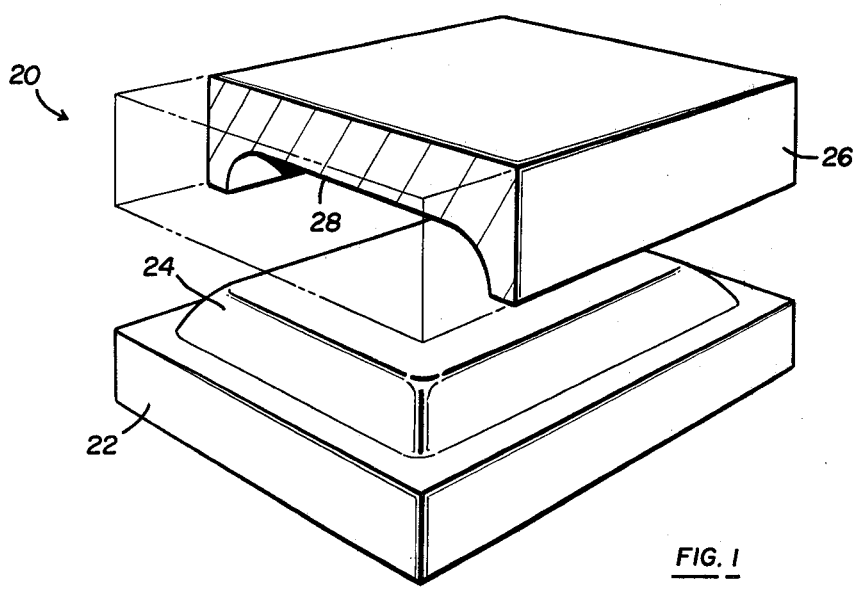
FIG. 1 is a perspective view of a die set, with the upper die cross-sectioned, which may be used in the method of this invention.
Figure 2:
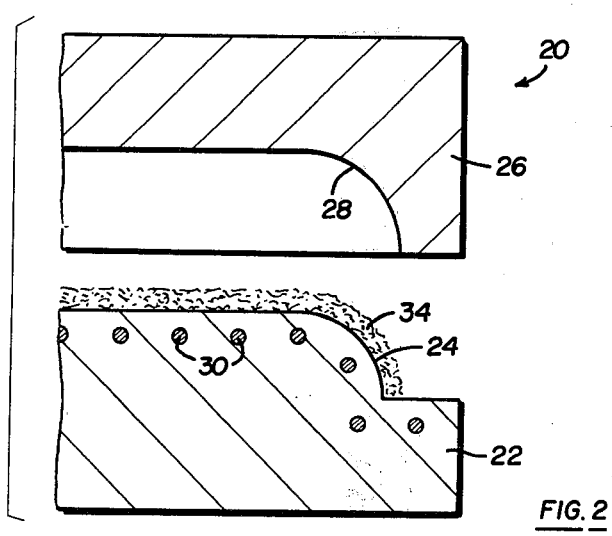
FIG. 2 is a partial end cross-sectional view of the die set shown in FIG. 1 including a resin impregnated fiberglass sheet ready for forming.
Figure 4:
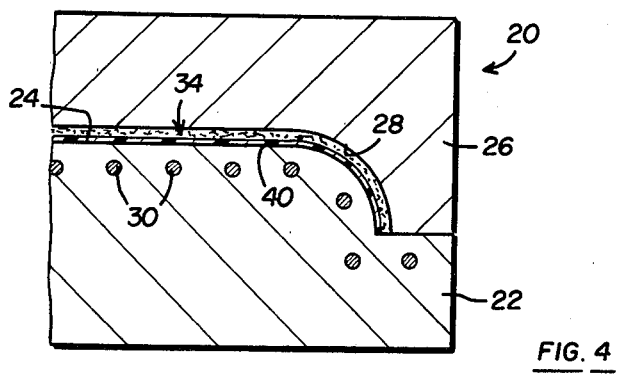
FIG. 4 is a partial end cross-sectional view of the die set shown in FIGS. 1 and 2 forming and kiss curing the resin impregnated fiberglass sheet of FIG. 3.

As described above, the forming process of this invention is a two step method, wherein the smooth finish surface is first cured in a first die set 20, as shown in FIG. 1. The first die set includes a male die member 22 having a convex contoured forming surface 24, and a female die member 26 having a matching concave contoured forming surface 28. As shown in FIGS. 2 and 4, the opposed contoured die surfaces 24 and 28 are substantially evenly spaced throughout their forming contours to evenly compress the fiberglass sheet 34. One die member 22 is heated by circulating steam or heated fluid through heating conduits 30. The opposed die member 26 may be unheated or cooled by refrigeration coils in the die member, not shown.

The disclosed embodiment of the method of this invention is an automotive headliner, wherein the interior concave surface of the sheet or panel, which is formed by the convex surface 24 of the male die member 22, is the finish surface of the contoured sheet. The following description will be limited to this embodiment for illustrative purposes only, however the method of this invention is particularly suitable to forming large self-supporting contoured sheets having predetermined variations in density. It will be understood however that the method of this invention may be utilized to form any lightweight contoured panel, including interior automotive panels and other decorative or structural panels.

An uncured resin impregnated fiberglass sheet suitable for use in forming automotive headliners is presently available from Owens-Corning Fiberglass Corporation and other manufacturers. The fiberglass sheet has a variable thickness averaging about one inch and a density of 76 grams per square foot or two pounds per cubic foot. The preferred thickness and density will however depend upon the contoured panel to be formed.

Figure 5:
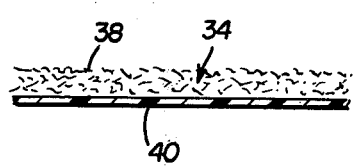
FIG. 5 is a partial end cross-sectional view of the partially cured resin-fiberglass sheet formed in the die set of FIGS. 2 and 4.

The uncured resin impregnated fiberglass sheet 34 is formed in the first die set as shown in FIG. 4, wherein the opposed die surfaces 24 and 28 are substantially evenly spaced throughout their forming contours and the sheet is substantially fully and evenly compressed to iron out any wrinkles in the sheet. In the disclosed embodiment of the headliner, the bottom concave surface 36 of the sheet is simultaneously heated by the heated male die member 22, which cures the smooth finish surface of the sheet. The thickness of the cured film 40, which is exaggerated somewhat in FIGS. 4 and 5, will depend upon the temperature of the die and the curing time. In a typical application, the temperature of the male die is between about 400° and 550° F. At this temperature, a cured resin film impregnated with fiberglass is formed on the smooth finish surface of about one mil. per second. Thus, a film thickness of 0.005 to 0.050 inches may be formed in five to fifty seconds. The thermosetting resin does migrate toward the heated die surface forming an enriched cured thermosetting resin film on the contoured fiberglass sheet. The smooth contoured finish surface 40 is thus permanently set in the fiberglass sheet in the first die set and the sheet may then be reformed in a second die set, as now described.

Figure 6:
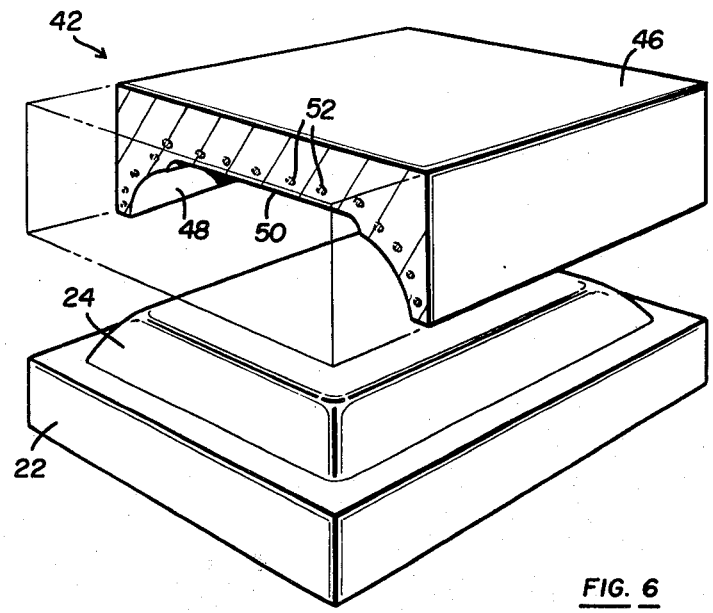
FIG. 6 is a perspective view of a second die set with the top die partially cross-sectioned.
Figure 7:
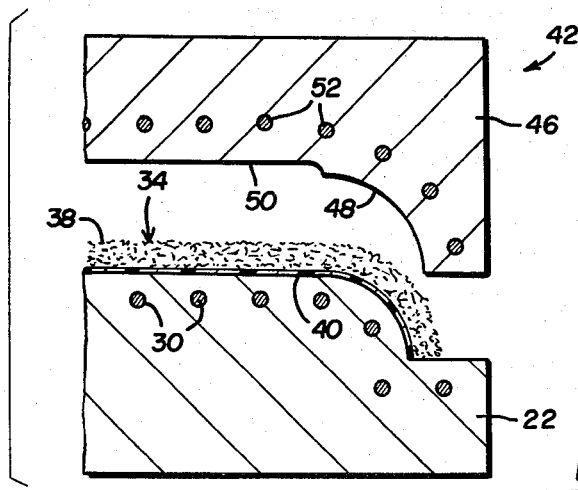
FIG. 7 is a partial end cross-sectional view of the second die set shown in FIG. 6, including the partially cured resin impregnated fiberglass sheet of FIG. 5.

In the most preferred embodiment of the method of this invention, the male die member 22 is common to both die sets. The second die set 42 thus includes the male die member 22 from the first die set and a heated female die member 46 having a contoured concave die surface 48. Where the contoured sheet to be formed by the method of this invention includes areas of reduced density, such as automotive headliners, the female die member includes a relieved area 50 spaced further from the male die member than the concave surface, as shown in FIGS. 6 and 7. The female die member may be heated by steam or heated fluid which is circulated through heating conduits 52.

Figure 8:
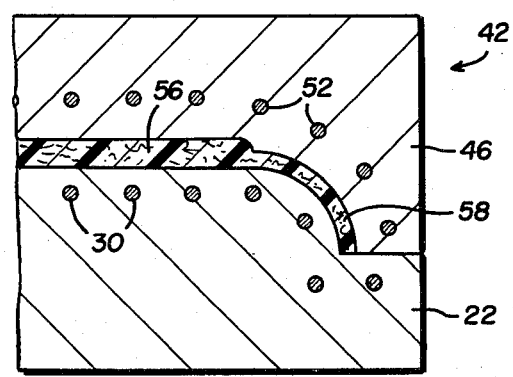
FIG. 8 is a partial end cross-sectional view of the second die set, as shown in FIG. 7, after forming and curing of the resin-fiberglass sheet.

The partially cured fiberglass sheet having the cured smooth finish surface 40 is located between the dies as shown in FIG. 7. Where the male die member 22 is common to both die members, the sheet may be retained on the male die member, as described hereinbelow. The die member contacting the cured finish surface should however substantially conform to the contoured configuration of the partially cured sheet where a different die member is utilized to retain the smooth contour of the finish surface. The sheet is formed and the resin is fully cured in the second die set 42 as shown in FIG. 8. Both die members 22 and 46 are heated in the second die set to fully cure the resin. In the disclosed embodiment of the method of this invention, wherein an automotive headliner is formed, the female die member 46 may be heated to a temperature of 400° to 550° F., which is the temperature of the male die member 22. At this temperature, the resin-fiberglass headliner will be fully cured in one to three minutes dependent upon the temperature of the dies. The forming pressure will also be dependent upon the particular application. A suitable pressure for the first die set is five pounds per square inch. A suitable pressure for the second die set is four pounds per square inch.

Figure 9:
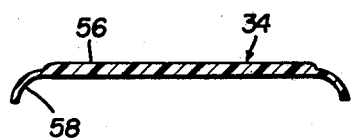
FIG. 9 is an end cross-sectional view of the resin-fiberglass contoured sheet formed by the die sets shown in FIGS. 1 and 6.

FIG. 9 is a cross-sectional view of an automotive headliner formed by the method of this invention. As shown, the midportion 56 of the headliner is thicker and therefore has a lesser density than the end portions 58. In a typical headliner, the thickness of the central portion is about 80 percent of the original thickness of the sheet, or about 0.8 inches in thickness, providing excellent sound attenuation and heat absorption. The side and end portions have a thickness of about 0.125 inches, providing strength and support for the headliner. FIG. 10 illustrates a continuous shuttle process which may be utilized in the method of this invention. As shown, the male die member 22 is shuttled between the unheated female die member 26 of the first die set 20 and the heated female die member 46 of the second die set 42. The male die member may be supported on tracks, not shown, for continuous operation. The uncured resin impregnated sheet 34 is received on the male die member 22 and the dies are closed to compress the sheet, ironing out any wrinkles and simultaneously setting the smooth finish surface, as described in regard to FIGS. 2 and 4. The male die member 22 and the partially cured resin impregnated sheet is then shuttled beneath the heated female die member 46 and the contoured resin-fiberglass sheet is fully cured as described in regard to FIGS. 7 and 8. It will be understood that pressure release ports may be provided in the female dies to remove entrapped air or the sheet may be initially secured to the female die to avoid entrapping air between the female die and the sheet.

Figure 3:
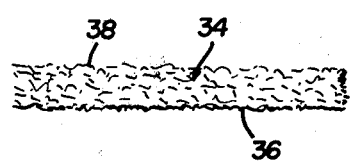
FIG. 3 is a partial end view of the resin impregnated fiberglass sheet shown in FIG. 2.

FIGS. 11 and 12 illustrate a method of reducing or eliminating uncontrolled variations in the density of the headliner. As described above, the density of the fiberglass sheet varies and normally includes areas or pockets of reduced density. Where two sheets are overlaid, the areas of different density will not normally be aligned, resulting in a more uniform density for the composite sheet. The second sheet 60 is laid over the top surface of the first sheet 34, which has been formed and partially cured in the first die set. The second sheet is laid over the top surface 38 of the first sheet, opposite the cured finish surface 40. The sheets are then formed in the second die set 42 as shown in FIG. 11, forming an integral and continuous laminate as shown in FIG. 8. The combined thickness of the two sheets 34 and 60 may be identical to the thickness of the sheet 34 in FIG. 3 or the combined thickness may be greater, particularly where extra loft is desired. It is also possible to use sheets of different average density for particular applications. For example, the first sheet may have a density of 1.5 pounds per cubic foot to provide a denser surface adjacent the finish surface and the second sheet may have a density of 0.5 pounds per cubic foot, to improve the heat absorption adjacent the top surface.

It will be understood by those skilled in the art that various modifications may be made to the disclosed embodiments of the apparatus, which has not been disclosed in detail, and the method of this invention. For example, separate male dies may be used in the first and second die set. Either die member may be the movable die and the die sets normally include die platens which support the die members and hydraulic or pneumatic pistons which move the die members and compress the sheet. The configuration of the contoured dies will be dependent upon the contoured sheet to be formed. Other modifications may also be made to the method of this invention within the perview of the appended claims, which follow.

We claim:

1. A method of forming a resin impregnated contoured fiberglass sheet having a smooth finish surface and a back surface, comprising the following steps:
   (a) forming a sheet of loose glass fibers impregnated with an uncured thermosettable resin in a first die set having opposed relatively moveable similarly contoured dies, said dies being substantially evenly spaced throughout their forming contours including closing said first die set to compress said fiberglass sheet, the forming pressure of said first die set being sufficient to substantially fully compress said sheet and iron out any wrinkles in said sheet, and only one of said dies being heated to cure the resin in said smooth finish surface;
   (b) releasing said forming pressure of said first die set, permitting said fiberglass sheet to expand to substantially the original thickness; and
   (c) forming said fiberglass sheet in a second die set having opposed heated relatively moveable differently contoured dies by closing said second die set to compress said fiberglass sheet between said contoured heated dies, said dies completing the curing of the remaining uncured resin in said fiberglass sheet and permanently setting the contour of said sheet, while retaining said smooth finish surface.

2. The method of forming a resin-fiberglass sheet defined in claim 3, including a contoured finish surface die contacting said finish surface of said sheet which is common to said first and second die sets, including aligning said finish surface die with a first unheated die of said first die set, said first die set compressing said sheet and simultaneously curing the surface layer of said finish surface of said sheet, then aligning said finish surface die with a second heated die of said second die set and forming and curing said resin impregnated sheet into the contour of said second die set.

3. The method of forming a contoured resin-fiberglass sheet defined in claim 1, wherein one die of said second die set substantially conforms to the contoured configuration of said finish surface and the opposed die is spaced from said one die a distance greater than the spacing between said opposed contoured dies of said first die set.

4. The method of forming a contoured resin-fiberglass sheet defined in claim 3, characterized in that said opposed die of said second die set includes a relieved area forming an area of reduced density in said sheet extending from said back surface of said sheet.

5. A method of forming a permanently contoured resin impregnated fiberglass sheet having a smooth contoured finish surface, comprising the following steps:
   (a) inserting a sheet of loose fiberglass fibers impregnated with uncured resin in a first die set between opposed relatively moveable die platens, said die platens having opposed similarly contoured generally equally spaced die faces, with but one of said die faces being heated;
   (b) relatively moving said die platens of said first die set to generally uniformly compress said fiberglass sheet between said contoured die faces, the compression of said contoured die faces being sufficient to remove wrinkles in said fiberglass sheet, and said heated die face simultaneously curing resin in a heated surface layer of said fiberglass sheet, forming a relatively smooth permanently contoured finish surface on said fiberglass sheet adjacent said heated die;
   (c) removing the die pressure of said first die set permitting said fiberglass sheet to expand;
   (d) inserting said fiberglass sheet in a second die set between opposed relatively moveable die platens, said die platens having opposed contoured heated die faces, one die face conforming to said contoured finish surface of said fiberglass sheet and contacting said finish surface, and said opposed contoured die face having a different contour; and
   (e) relatively moving said die platens of said second die set to compress said fiberglass sheet between said heated die faces permanently forming said fiberglass sheet to the contoured shape of said die faces, curing remaining said resin in said fiberglass sheet and forming a permanently contoured fiberglass sheet.

6. The method of forming a fiberglass-resin contoured sheet defined in claim 5, including applying a second uncured resin impregnated fiberglass sheet over said back surface of said partially cured resin sheet, prior to forming said sheet in said second die set, and simultaneously forming, curing and bonding said sheets in said second die set.

7. The method of forming a fiberglass-resin permanently contoured sheet defined in claim 5, wherein the heated contoured die contacting said fiberglass sheet finish surface is common to said first and second die sets, including aligning said common heated die with a first unheated die of said first die set followed by the compressing of said fiberglass sheet and said simultaneously curing the surface layer of said finish surface, then aligning said common heated die with a second heated die of said second die set and forming and then curing remaining resin of said fiberglass sheet into a permanently contoured shape.

8. The method of forming a fiberglass-resin contoured sheet as defined in claim 7, wherein said common heated die has a heated generally convex male die face and the opposed dies of said first and second die sets have generally concave female die faces, including aligning said common heated male die face with an unheated female die face of said first die set and compressing said sheet, then moving said common heated male die and said partially cured fiberglass sheet supported thereon into alignment with a heated female die face of said second die set before said forming and curing said fiberglass sheet.

9. A method of forming a permanently contoured resin impregnated fiberglass sheet having a smooth contoured finish surface, and a differently contoured back surface, comprising the steps of:
   (a) inserting a sheet of loose fiberglass fibers impregnated with uncured resin between a first heated die platen and a second unheated die platen, said die platens being relatively moveable and having opposed substantially uniformly spaced contoured die faces;
   (b) relatively moving said first and second die platens to substantially fully compress said fiberglass sheet between said contoured die faces, the compression of said contoured die faces being sufficient to remove wrinkles in said fiberglass sheet, and said first heated die platen die face simultaneously curing the resin in the heated surface layer of said fiberglass sheet, forming a relatively smooth contoured finish surface on partially cured portions of said fiberglass sheet;
   (c) removing the die pressure of said first and second die platens permitting said fiberglass sheet to expand;
   (d) forming said fiberglass sheet between the contoured die face of said first heated die platen and a third relatively moveable die platen having an opposed differently contoured heated die face by relatively moving said first and third die platens to compress said fiberglass sheet between said differently contoured die faces, permanently forming said fiberglass sheet to the contoured shape of said die faces, curing remaining uncured resin in said fiberglass sheet to form a permanently contoured fiberglass sheet.

10. The method of forming a resin impregnated fiberglass contoured sheet as defined in claim 9, including applying a second uncured resin impregnated fiberglass sheet over the back uncured surface of said fiberglass sheet, prior to forming said sheet between said first and third die platens, and simultaneously forming, curing and bonding said sheets between said first heated contoured die and said third heated die in a continuous laminate.

11. The method of forming a resin impregnated fiberglass contoured sheet as defined in claim 9, wherein said first heated die platen has a convex male die face and said second and third die platens have generally concave female die faces, including transferring said first heated die platen with said fiberglass sheet supported on said male die face into alignment with said third heated die platen, followed by said forming and curing of said fiberglass sheet between the heated die faces of said first and third heated die platens.

12. A method of forming a contoured fiber sheet, comprising the steps of:
   (a) forming a first uncured resin impregnated loosely woven sheet of inert fibers under substantially even pressure in a first die set having opposed substantially evenly spaced relatively moveable matching contoured dies, by relatively closing said contoured dies of said first die set and compressing said sheet, the forming pressure of said dies being sufficient to substantially fully compress said first sheet and iron out any wrinkles in said sheet;
   (b) simultaneously heating one surface of the first fiberglass sheet, curing resin in a surface layer of said fiberglass sheet to form a finish surface on said sheet with resin adjacent the opposed surface of said sheet remaining uncured;

(c) removing the forming pressure of said first die set, permitting the first fiberglass sheet to expand;

(d) applying a second uncured resin impregnated sheet of loosely woven inert fibers over the opposed uncured surface of said sheet; and (e) forming said sheets between relatively moveable heated differently contoured dies under heat and pressure, simultaneously curing said resin and laminating said sheets into a permanently contoured shape.

13. The method of forming a contoured fiber sheet as defined in claim 12, wherein said first sheet is formed in a first die set having a heated die member heating and curing said finish surface of said first sheet and an unheated die member contacting said opposed surface, said sheets are then formed, cured and laminated in a second die set having opposed contoured heated die members.

* * * * *